(12) United States Patent
Hastings et al.

(10) Patent No.: US 10,691,880 B2
(45) Date of Patent: Jun. 23, 2020

(54) INK IN AN ELECTRONIC DOCUMENT

(71) Applicant: Microsoft Technology Licensing, LLC, Redmond, WA (US)

(72) Inventors: Ryan Lucas Hastings, Seattle, WA (US); Daniel McCulloch, Snohomish, WA (US); Michael John Patten, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 503 days.

(21) Appl. No.: 15/199,539

(22) Filed: Jun. 30, 2016

(65) Prior Publication Data

US 2017/0286385 A1 Oct. 5, 2017

Related U.S. Application Data

(60) Provisional application No. 62/314,835, filed on Mar. 29, 2016.

(51) Int. Cl.
| | |
|---|---|
| *G06F 40/171* | (2020.01) |
| *G06T 11/60* | (2006.01) |
| *G06F 3/0484* | (2013.01) |
| *G06F 3/0488* | (2013.01) |
| *G06F 3/0481* | (2013.01) |
| *G06F 40/14* | (2020.01) |
| *G06F 40/117* | (2020.01) |
| *G06F 40/151* | (2020.01) |
| *G06F 40/169* | (2020.01) |
| *G06F 40/197* | (2020.01) |

(Continued)

(52) U.S. Cl.
CPC ........ *G06F 40/171* (2020.01); *G06F 3/03545* (2013.01); *G06F 3/0488* (2013.01); *G06F 3/04815* (2013.01); *G06F 3/04842* (2013.01); *G06F 3/04845* (2013.01); *G06F 3/04883* (2013.01); *G06F 3/14* (2013.01); *G06F 40/117* (2020.01); *G06F 40/14* (2020.01); *G06F 40/151* (2020.01); *G06F 40/169* (2020.01); *G06F 40/197* (2020.01); *G06T 11/60* (2013.01); *G06T 19/20* (2013.01); *G06F 2203/04807* (2013.01); *G06T 2200/24* (2013.01)

(58) Field of Classification Search
CPC ............................. G06F 3/0481; G06F 17/242
USPC ......................................................... 715/229
See application file for complete search history.

(56) References Cited

U.S. PATENT DOCUMENTS

| | | | |
|---|---|---|---|
| 7,107,549 B2 | 9/2006 | Deaton et al. | |
| 8,401,336 B2 | 3/2013 | Baldridge et al. | |

(Continued)

OTHER PUBLICATIONS

Akuratny, "Design Gift Boxes Using Illustrator's 3D Tools," 2008 (Year: 2008).*

(Continued)

*Primary Examiner* — Andrew R Dyer

(57) ABSTRACT

Techniques for ink in an electronic document are described. According to various implementations, techniques described herein provide a rich set of tools which allow a user to markup an electronic document such as a web page, not only in static 2D where the user writes on top of a document, but in dynamic 3D. In addition, when adding 3D elements to an electronic document, the 3D elements are added based on awareness of the content of the electronic document and can adapt its content in relationship to the document.

20 Claims, 14 Drawing Sheets

(51) Int. Cl.
*G06F 3/0354* (2013.01)
*G06F 3/14* (2006.01)
*G06T 19/20* (2011.01)

(56) References Cited

U.S. PATENT DOCUMENTS

| | | | |
|---|---|---|---|
| 8,402,394 B2 | 3/2013 | Blake et al. | |
| 9,007,371 B2 | 4/2015 | Matas et al. | |
| 9,224,238 B2* | 12/2015 | Weill | G06T 15/205 |
| 9,721,045 B2* | 8/2017 | Arrighi | G06F 3/04815 |
| 9,886,102 B2* | 2/2018 | Hosenpud | G06F 3/0346 |
| 2003/0197737 A1* | 10/2003 | Kim | G06F 16/954 |
| | | | 715/781 |
| 2004/0100489 A1 | 5/2004 | Berestov et al. | |
| 2010/0169837 A1* | 7/2010 | Hyndman | G06F 3/04815 |
| | | | 715/848 |
| 2011/0050687 A1* | 3/2011 | Alyshev | G06T 15/00 |
| | | | 345/419 |
| 2011/0161843 A1* | 6/2011 | Bennett | G06F 3/14 |
| | | | 715/760 |
| 2012/0013613 A1* | 1/2012 | Vesely | G06F 3/011 |
| | | | 345/419 |
| 2012/0046078 A1* | 2/2012 | Kim | H04N 13/359 |
| | | | 455/566 |
| 2012/0050284 A1* | 3/2012 | Ahn | H04N 13/261 |
| | | | 345/419 |
| 2012/0084652 A1* | 4/2012 | Martinez Bauza | H04N 13/167 |
| | | | 715/719 |
| 2012/0099804 A1 | 4/2012 | Aguilera et al. | |
| 2012/0162214 A1* | 6/2012 | Chavez | H04N 13/366 |
| | | | 345/419 |
| 2013/0083021 A1* | 4/2013 | Cohen | G06T 17/00 |
| | | | 345/420 |
| 2013/0090101 A1* | 4/2013 | Park | G06F 3/147 |
| | | | 455/414.3 |
| 2013/0212538 A1 | 8/2013 | Lemire et al. | |
| 2014/0143733 A1* | 5/2014 | Jung | G06F 3/04815 |
| | | | 715/848 |
| 2014/0184589 A1* | 7/2014 | Vesely | G06F 3/012 |
| | | | 345/419 |
| 2014/0240312 A1* | 8/2014 | Vesely | G06T 15/00 |
| | | | 345/419 |
| 2014/0267637 A1* | 9/2014 | Hoberman | G06F 3/011 |
| | | | 348/53 |
| 2015/0035821 A1* | 2/2015 | Andriotis | G06F 40/14 |
| | | | 345/419 |
| 2015/0062125 A1 | 3/2015 | Aguilera Perez et al. | |
| 2015/0082180 A1* | 3/2015 | Ames | G06F 3/04815 |
| | | | 715/738 |
| 2015/0082181 A1* | 3/2015 | Ames | G06F 3/04815 |
| | | | 715/738 |
| 2015/0091906 A1* | 4/2015 | Dishno | G06F 16/9577 |
| | | | 345/427 |
| 2015/0123891 A1* | 5/2015 | Tu | G06F 3/017 |
| | | | 345/156 |
| 2015/0170397 A1 | 6/2015 | Han et al. | |
| 2015/0331575 A1* | 11/2015 | Fernandez-Ruiz | G06F 3/04815 |
| | | | 715/850 |
| 2016/0154457 A1* | 6/2016 | Osaragi | G06F 3/011 |
| | | | 345/179 |
| 2016/0314100 A1* | 10/2016 | Seo | G06F 40/117 |
| 2017/0024112 A1* | 1/2017 | McKegney | G06F 3/04847 |
| 2017/0161937 A1* | 6/2017 | Dideriksen | G06F 3/04845 |

OTHER PUBLICATIONS

Adobe, "Adobe Dreannweaver CC Help," 2015 (Year: 2015).*
Faithe Wempen, Chapter 17 "Presenting a Slide Show", In: Office 2016 at Work for Dummies, Oct. 30, 2015, 17 pages.
"International Search Report and Written Opinion", Application No. PCT/US2017/024209, dated Jun. 7, 2017, 11 pages.
"Microsoft: Screenshots of Microsoft PowerPoing 2010, Version 14.0", Retrieved from: https://products.office.com/en-us/microsoft-powerpoint-10—dated Jun. 14, 2017, 15 pages.
"Smart Ink 3.2 User's Guide", Retrieved at: http://downloads.smarttech.com/media/sitecore/en/support/product/smartink/smartink3/guides/guidesmartink3_2winv01dec15.pdf, Dec. 2015, 64 pages.
Jung,"Annotating and Sketching on 3D Web Models", 2002 International Conference on Intelligent User Interfaces, Jan. 13, 2002, 8 pages.
Purewal,"You can now write on Web pages in Windows 10", www.cnet.com/how-to/you-can-now-writeon-webpages-in-windows-10, Jun. 30, 2015, 3 pages.
"Firefox Adds New Developer Tools and Add-on Sync", Published on: Mar. 13, 2012 Available at: https://blog.mozilla.org/blog/2012/03/13/firefox-adds-new-developer-tools-and-add-on-sync/.
"Developer-oriented features and experiments", Published on: Oct. 31, 2011 Available at: https://blog.mozilla.org/tilt/.
"Three-Dimensional Web Pages Possible With Browser Plug-In", Published on: Sep. 18, 2008 Available at: http://www.foxnews.com/story/2008/09/18/three-dimensional-web-pages-possible-with-browser-plug-in.html.

* cited by examiner

INK IN AN ELECTRONIC DOCUMENT

PRIORITY

This application claims priority to U.S. Provisional Application Ser. No. 62/314,835 entitled "Smart Inking" and filed Mar. 29, 2016, the disclosure of which is incorporated by reference herein in its entirety.

BACKGROUND

Devices today (e.g., computing devices) typically support a variety of different input techniques. For instance, a particular device may receive input from a user via a keyboard, a mouse, voice input, touch input (e.g., to a touchscreen), and so forth. One particularly intuitive input technique enables a user to utilize a touch instrument (e.g., a pen, a stylus, a finger, and so forth) to provide freehand input to a touch-sensing functionality such as a touchscreen, which is interpreted as digital ink. The freehand input may be converted to a corresponding visual representation on a display, such as for taking notes, for creating and editing an electronic document, and so forth. Many current techniques for digital ink, however, typically provide limited ink functionality.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for ink in an electronic document are described. According to various implementations, techniques described herein provide a rich set of tools which allow a user to markup an electronic document such as a web page, not only in static 2D where the user writes on top of a document, but in dynamic 3D. In addition, when adding 3D elements to an electronic document, the 3D elements are added based on awareness of the content of the electronic document and can adapt its content in relationship to the document.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for ink in an electronic document are described. Generally, ink refers to freehand input to a touch-sensing functionality and/or a functionality for sensing touchless gestures, which is interpreted as digital ink, referred to herein as "ink." Ink may be provided in various ways, such as using a pen (e.g., an active pen, a passive pen, and so forth), a stylus, a finger, touchless gesture input, and so forth.

According to various implementations, ink in an electronic document provides a rich set of tools which allows a user to markup an electronic document such as a web page, not only in static 2D where the user writes on top of a document, but in dynamic 3D. In addition, when adding 3D elements to an electronic document, the 3D elements are added based on awareness of the content of the electronic document and can adapt its content in relationship to the document.

Generally, the techniques described herein provide for increased computational efficiency by reducing computer operations required to place an electronic document such as a web page in an editable form. Further, techniques for ink in an electronic document enable interactions with electronic documents that were not previously possible via ink input.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
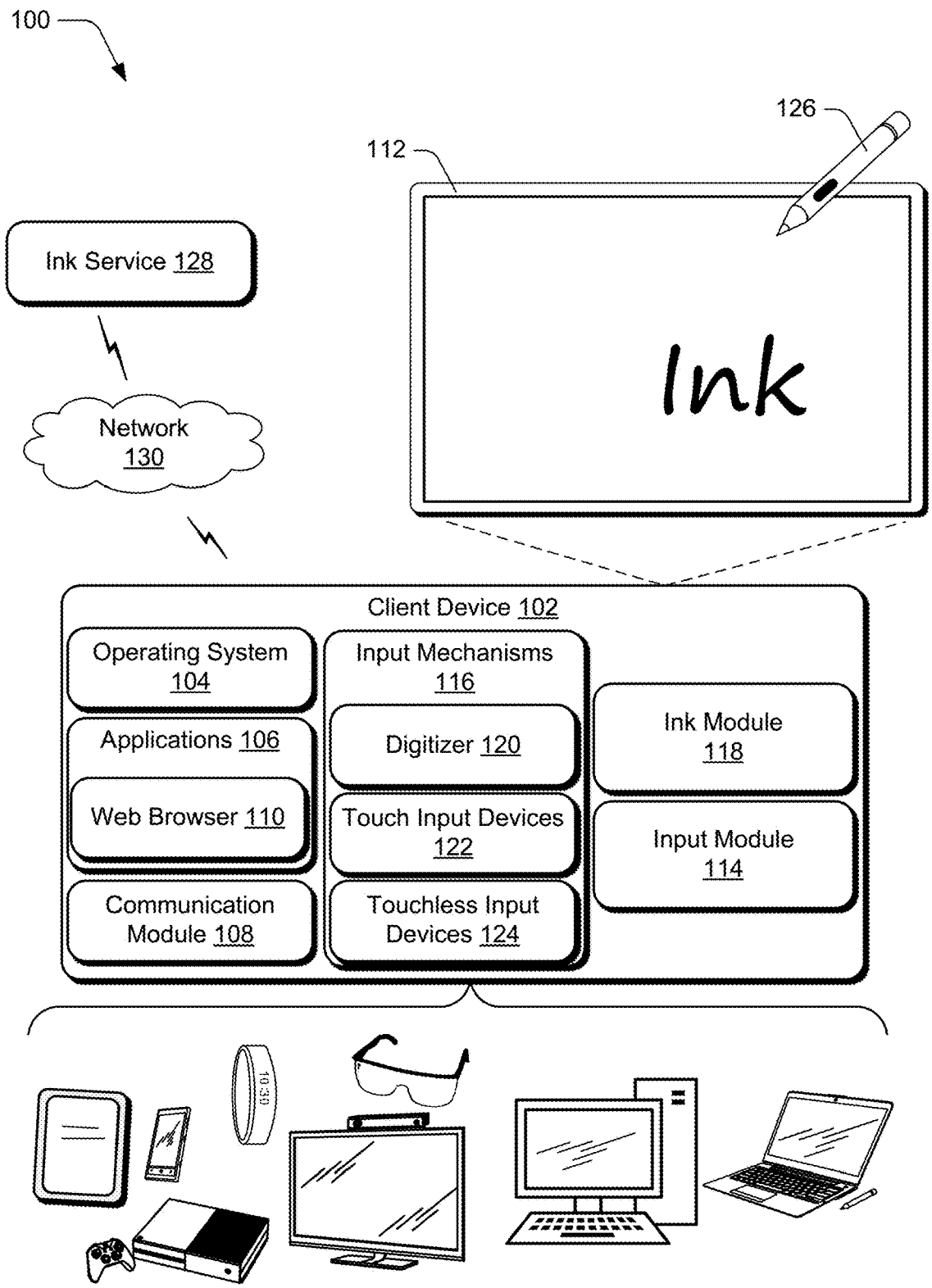
FIG. 1 is an illustration of an environment in an example implementation that is operable to employ techniques discussed herein in accordance with one or more embodiments.

FIG. 1 is an illustration of an environment 100 in an example implementation that is operable to employ techniques for ink in an electronic document discussed herein. Environment 100 includes a client device 102 which can be embodied as any suitable device such as, by way of example and not limitation, a smartphone, a tablet computer, a portable computer (e.g., a laptop), a desktop computer, a wearable device, and so forth. In at least some implementations, the client device 102 represents a smart appliance, such as an Internet of Things ("IoT") device. Thus, the client device 102 may range from a system with significant processing power, to a lightweight device with minimal processing power. One of a variety of different examples of a client device 102 is shown and described below in FIG. 14.

The client device 102 includes a variety of different functionalities that enable various activities and tasks to be performed. For instance, the client device 102 includes an operating system 104, applications 106, and a communication module 108. Generally, the operating system 104 is representative of functionality for abstracting various system components of the client device 102, such as hardware, kernel-level modules and services, and so forth. The operating system 104, for instance, can abstract various components (e.g., hardware, software, and firmware) of the client device 102 to the applications 106 to enable interaction between the components and the applications 106.

The applications 106 represents functionalities for performing different tasks via the client device 102. Examples of the applications 106 include a word processing application, a spreadsheet application, a web browser 110, a gaming application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 108 is representative of functionality for enabling the client device 102 to communication over wired and/or wireless connections. For instance, the communication module 108 represents hardware and logic for communication via a variety of different wired and/or wireless technologies and protocols.

The client device 102 further includes a display device 112, an input module 114, input mechanisms 116, and an ink module 118. The display device 112 generally represents functionality for visual output for the client device 102. Additionally, the display device 112 represents functionality for receiving various types of input, such as touch input, pen input, and so forth.

The input module 114 is representative of functionality to enable the client device 102 to receive input (e.g., via the input mechanisms 116) and to process and route the input in various ways.

The input mechanisms 116 generally represent different functionalities for receiving input to the client device 102, and include a digitizer 120, touch input devices 122, and touchless input devices 124. Examples of the input mechanisms 116 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 116 may be separate or integral with the display device 112; integral examples include gesture-sensitive displays with integrated touch-sensitive or motion-sensitive sensors. The digitizer 120 represents functionality for converting various types of input to the display device 112, the touch input devices 122, and the touchless input devices 124 into digital data that can be used by the client device 102 in various ways, such as for generating digital ink, generating input signals, biometric recognition, and so forth.

The touchless input devices 124 generally represent different devices for recognizing different types of non-contact input, and are configured to receive a variety of touchless input, such as via visual recognition of human gestures, object scanning, voice recognition, color recognition, and so on. In at least some embodiments, the touchless input devices 124 are configured to recognize gestures, poses, body movements, objects, images, and so on, via cameras. An example camera, for instance, can be configured with lenses, light sources, and/or light sensors such that a variety of different phenomena can be observed and captured as input. For example, the camera can be configured to sense movement in a variety of dimensions, such as vertical movement, horizontal movement, and forward and backward movement, e.g., relative to the touchless input devices 124. Thus, in at least some embodiments, the touchless input devices 124 can capture information about image composition, movement, and/or position. The recognition module 108 can utilize this information to perform a variety of different tasks.

For example, the input module 114 can leverage the touchless input devices 124 to perform skeletal mapping along with feature extraction with respect to particular points of a human body (e.g., different skeletal points) to track one or more users (e.g., four users simultaneously) to perform motion analysis. In at least some embodiments, feature extraction refers to the representation of the human body as a set of features that can be tracked to generate input.

According to various implementations, the ink module 118 represents functionality for performing various aspects of techniques for ink in an electronic document discussed herein. Various functionalities of the ink module 118 are discussed below.

The environment 100 further includes a pen 126, which is representative of an input device for providing input to the display device 112. Generally, the pen 126 is in a form factor of a traditional pen but includes functionality for interacting with the display device 112 and other functionality of the client device 102. In at least some implementations, the pen 126 is an active pen that includes electronic components for interacting with the client device 102. The pen 126, for instance, includes a battery that can provide power to internal components of the pen 126.

Alternatively or additionally, the pen 126 may include a magnet or other functionality that supports hover detection over the display device 112. This is not intended to be limiting, however, and in at least some implementations the pen 126 may be passive, e.g., a stylus without internal electronics. Generally, the pen 126 is representative of an input device that can provide input that can be differentiated from other types of input by the client device 102. For instance, the digitizer 120 is configured to differentiate between input provided via the pen 126, and input provided by a different input mechanism such as a user's finger, a stylus, and so forth.

The environment 100 further includes an ink service 128 with which the client device 102 may communicate, e.g., via a network 130. Generally, the ink service 128 may be leveraged to perform various aspects of ink in an electronic document described herein. In at least some implementations, the ink service 128 represents a network-based service (e.g., a cloud service) that can perform various functionalities discussed herein.

The network 130 may be implemented in various ways, such as a wired network, a wireless network, and combinations thereof. In at least some implementations, the network 130 represents the Internet.

Having described an example environment in which the techniques described herein may operate, consider now a discussion of some example implementation scenarios in accordance with one or more embodiments.

Example Implementation Scenarios

This section describes some example implementation scenarios for ink in an electronic document in accordance with one or more implementations. The implementation scenarios may be implemented in the environment 100 described above, the system 1400 of FIG. 14, and/or any other suitable environment. The implementation scenarios and procedures, for example, describe example operations of the client device 102, the ink module 118, and/or the ink service 128. While the implementation scenarios are discussed with reference to a particular application (e.g., the web browser 110), it is to be appreciated that techniques for ink in an electronic document discussed herein are applicable across a variety of different applications, services, and environments.

Figure 2:
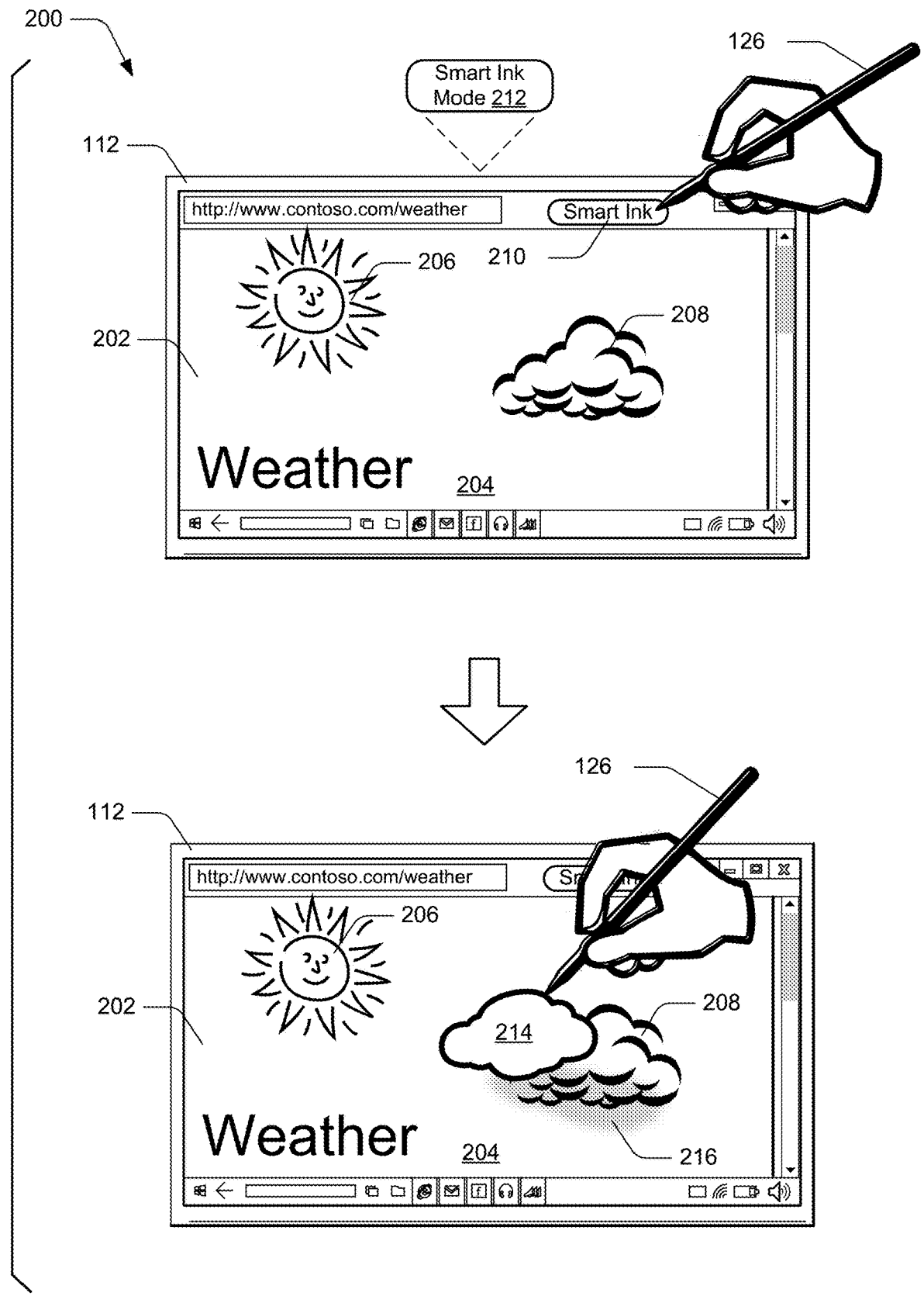
FIG. 2 depicts an example implementation scenario for adding ink content in a smart ink mode in accordance with one or more embodiments.

FIG. 2 depicts an example implementation scenario 200 for adding ink content in a smart ink mode in accordance with one or more implementations. The upper portion of the scenario 200 includes a graphical user interface (GUI) 202 displayed on the display device 112. Generally, the GUI 202 represents a GUI for the web browser 110. Also depicted is a user holding the pen 126. Displayed within the GUI 202 is a web page 204 which includes various graphical and textual elements. The web page 204, for instance, includes a graphical element 206 and a graphical element 208.

Further to the scenario 200, the user selects an ink mode control 210, which transitions the web browser 110 to a smart ink mode 212. Generally, invoking the smart ink mode 212 transforms the web page 204 into a 3-dimensional (3D) ink canvas that enables a variety of different interactions with and manipulations of the web page 204. For instance, in the smart ink mode 212, ink input to the web page 204 is applied in the context of the underlying structure of the web page 204. In the smart ink mode 212, for example, the web page 204 is converted into an "ink canvas," which is a 2-dimensional (2D) representation of a 3-dimensional (3D) canvas. Generally, an ink canvas is an interactive version of the web page 204 that enables various elements of the web page 204 to be viewable and editable in a simulated 3D environment. For instance, when ink is applied to the ink canvas while in the smart ink mode 212, the ink is affected by and/or affects an underlying structure of the web page 204, and is not simply applied as an ink layer on top of a static version of the web page 204.

Proceeding to the lower portion of the scenario 200, the user manipulates the pen 126 to apply ink to draw an ink object 214 on the web page 204. Since the web browser 110 is in the smart ink mode 212, the ink object 214 is treated as a 3D object that affects the web page 204. In this particular instance, drawing the ink object 214 causes a shadow 216 to be created that overlays a portion of the graphical element 208. The ink module 118, for instance, detects that the ink object 214 overlays a portion of the graphical element 208, and thus ascertains that ink object 214 is to be treated as having a higher layer order (e.g., z-order) on the web page 204 than the graphical element 208.

Accordingly, the ink object 214 is added as a 3D object that can be manipulated in 3D relative to the web page 204, such as by manipulating the depth of the ink object 214 relative to other elements of the web page 214. Generally, manipulating an element and/or an object in 3D as discussed herein refers to interaction with an element/object in a 2D context (e.g., displayed on the display device 112) that provides a visual simulation of a 3D environment.

Thus, the scenario 200 illustrates that techniques for ink in an electronic document enable an underlying structure of a web page to be considered in applying ink to the web page.

Figure 3:
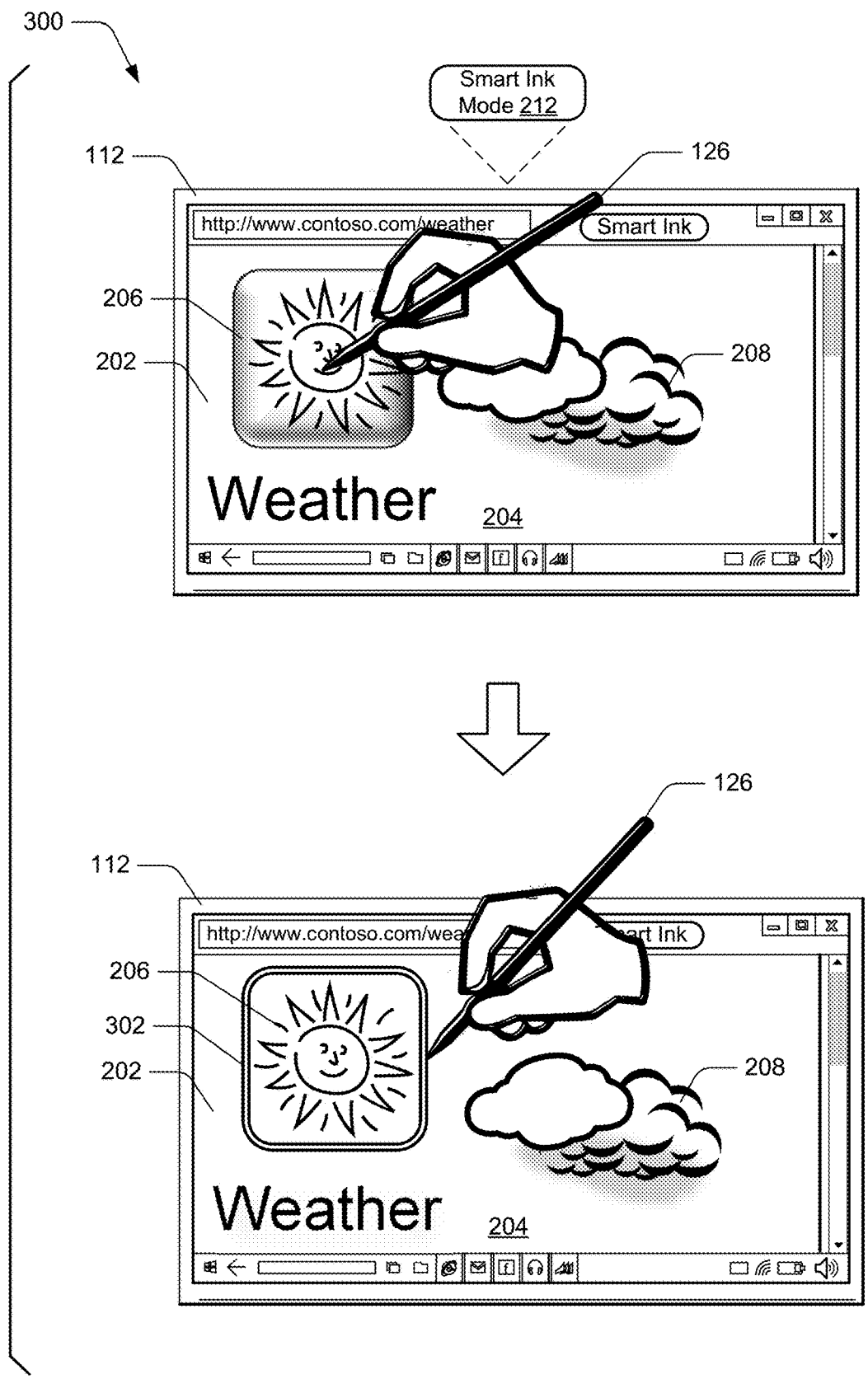
FIG. 3 depicts an example implementation scenario for element manipulation in accordance with one or more embodiments.

FIG. 3 depicts an example implementation scenario 300 for web element manipulation in accordance with one or more implementations. In at least some implementations, the scenario 300 represents a continuation and/or variation on the scenario 200. The upper portion of the scenario 300 includes the GUI 202 with the web page 204 displayed on the display device 112.

Further to the scenario 300, and while the smart ink mode 212 is active, the user manipulates the pen 126 to select the graphical element 206. This causes the graphical element 206 to enter an editing mode such that the user can edit the graphical element 206 in various ways. For instance, the graphical element 206 appears to visually pop out of the surface of the web page 204, which provides a visual cue that the graphical element 206 can be manipulated and edited in various ways, such as to affect the 2D/3D appearance and/or structure of the graphical element 206.

Proceeding to the lower portion of the scenario 300, the user draws a custom frame 302 around the graphical element 206 while the graphical element is in the editing mode. Accordingly, the custom frame 302 is added to the structure of the web page 204 when the user exits the editing mode for the graphical element 206.

The custom frame 302 is presented for purpose of example only, and it is to be appreciated that a wide variety of different modifications and effects can be applied to web page elements according to techniques described herein.

Thus, the scenario 300 illustrates that techniques for ink in an electronic document enable ink to be applied to affect an underlying structure of a web page.

Figure 4:
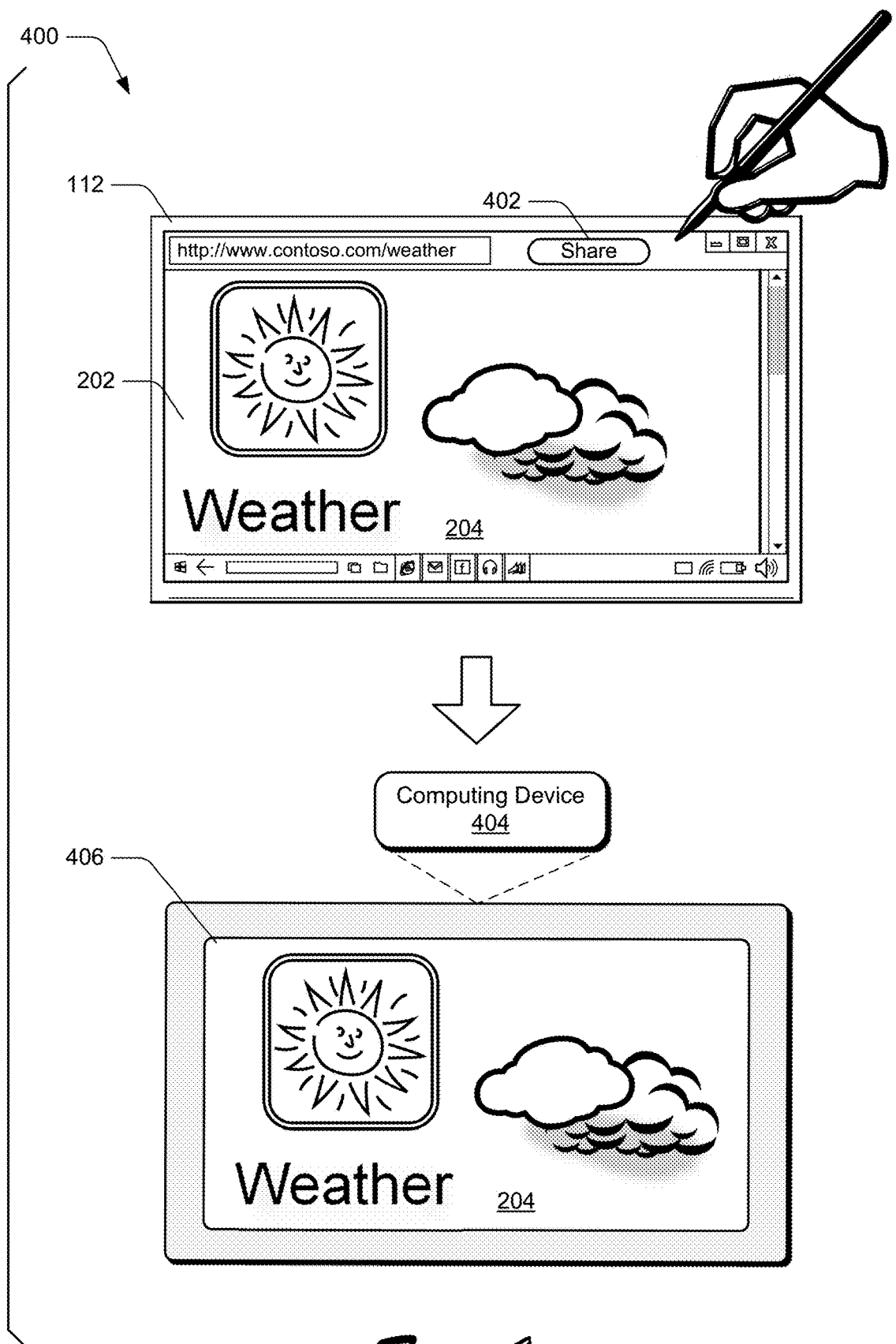
FIG. 4 depicts an example implementation scenario for canvas sharing in accordance with one or more embodiments.

FIG. 4 depicts an example implementation scenario 400 for canvas sharing in accordance with one or more implementations. In at least some implementations, the scenario 400 represents a continuation and/or variation on the scenarios 200-400 described above. The upper portion of the scenario 400 includes the GUI 202 with the web page 204 displayed on the display device 112. Generally, the web page 204 has been modified while in a smart ink mode as described in the scenarios 200, 300.

Further to the scenario 400, a user selects a share control 402, which causes the web page 204 to be shared to a computing device 404 and displayed as part of a display 406 of the computing device 404. The web page 204, for instance, represents a 3D canvas that is shared to the computing device 404. A user of the computing device 404 may invoke the smart ink mode to make further modifications to the web page 204, examples of which are discussed herein.

Generally, the web page 204 may be shared in various ways. For instance, the modified web page 204 is saved at a network location (e.g., the ink service 128) and a link (e.g., a hyperlink) to the web page 204 is shared to the computing device 404. The computing device 404, for instance, may access and interact with the web page 404 from the network location via the link. In another example, the web page 204 is saved as a web page file (e.g., a web archive (WAR) file), and the file is communicated to the computing device 404.

Thus, the scenario 400 illustrates that techniques for ink in an electronic document described herein may be employed to convert a web page into an interactive ink canvas that can be shared and revised by various users.

Figure 5:
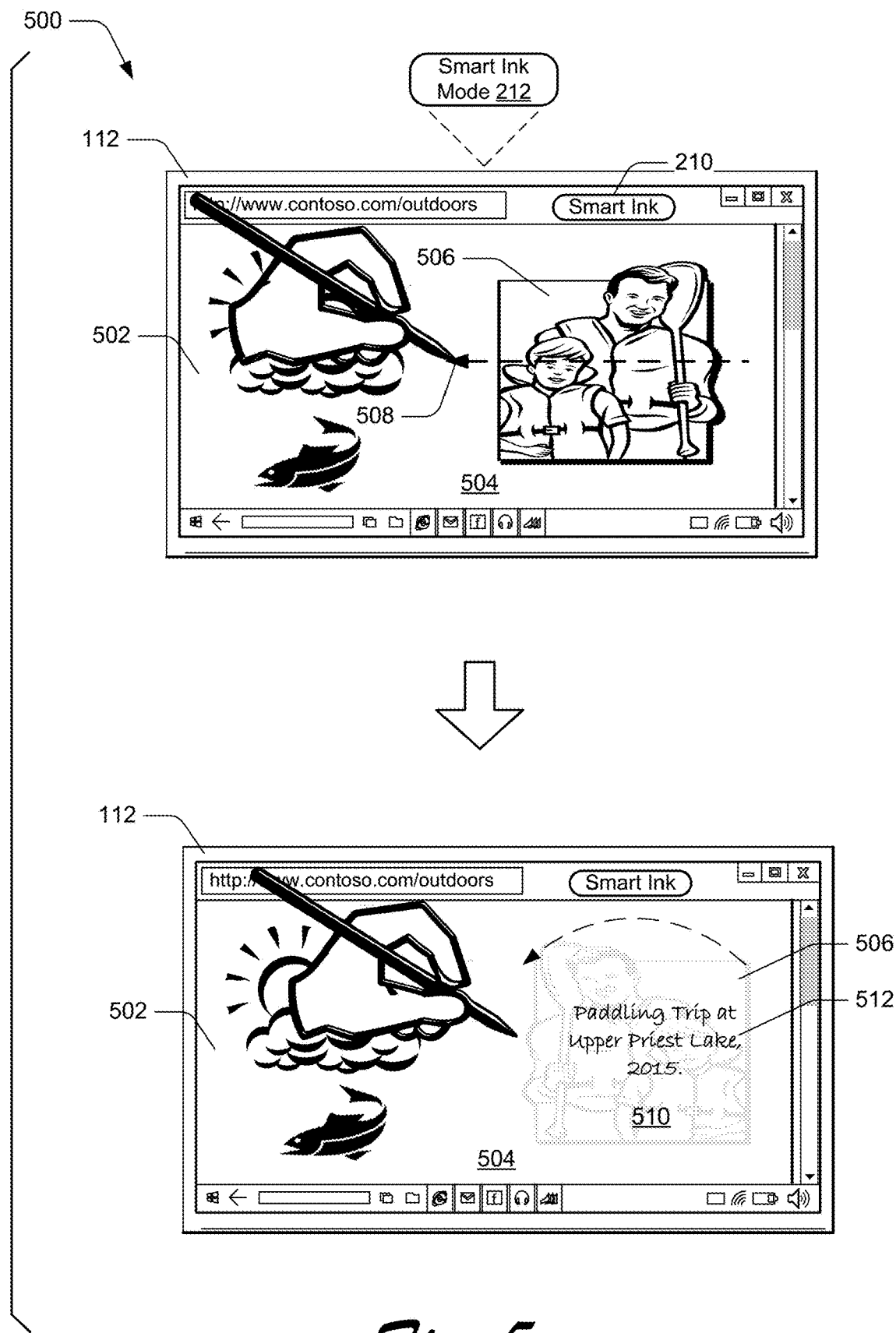
FIG. 5 depicts an example implementation scenario for 3D manipulation of web page elements in accordance with one or more embodiments

FIG. 5 depicts an example implementation scenario 500 for 3D manipulation of web page elements in accordance with one or more implementations. The upper portion of the scenario 500 includes a graphical user interface (GUI) 502 displayed on the display device 112. Generally, the GUI 502 represents a GUI for the web browser 110. Displayed within the GUI 502 is a web page 504 which includes various graphical and textual elements. The web page 204, for instance, includes a photograph ("photo") 506.

Further to the scenario 500, the user selects the ink mode control 210, which transitions the web browser 110 to the smart ink mode 212. Thus, the web page 504 is transformed into an ink canvas. The user then applies a manipulation gesture 508 with the pen 126 to the photo 506.

Responsive to the manipulation gesture 508 and proceeding to the lower portion of the scenario 500, the photo 506 is flipped within the GUI 502, e.g., 180 degrees. The gesture 508, for instance, causes the photo 506 to transition to an editing mode where the photo 506 can be edited in various ways. For example, flipping the photo 506 reveals a rear canvas 510 of the photo 506, which can be used for various purposes. As shown here, for instance, the user applies an ink annotation 512 to the rear canvas 510 using the pen 126. The ink annotation 512 becomes a permanent part of the web page 504, e.g., is added to content data and/or metadata for the photo 506. Thus, a user may subsequently access the ink annotation 512 along with the web page 504, such as via selection and/or other interaction with the photo 506.

In at least some implementations, the scenario 500 causes a published version of the web page 504 to be updated with the ink annotation 512 such that when a different user subsequently browses to the web page 504, the different user can access, view, and interact with the ink annotation 512 along with other portions of the web page 504.

Figure 6:
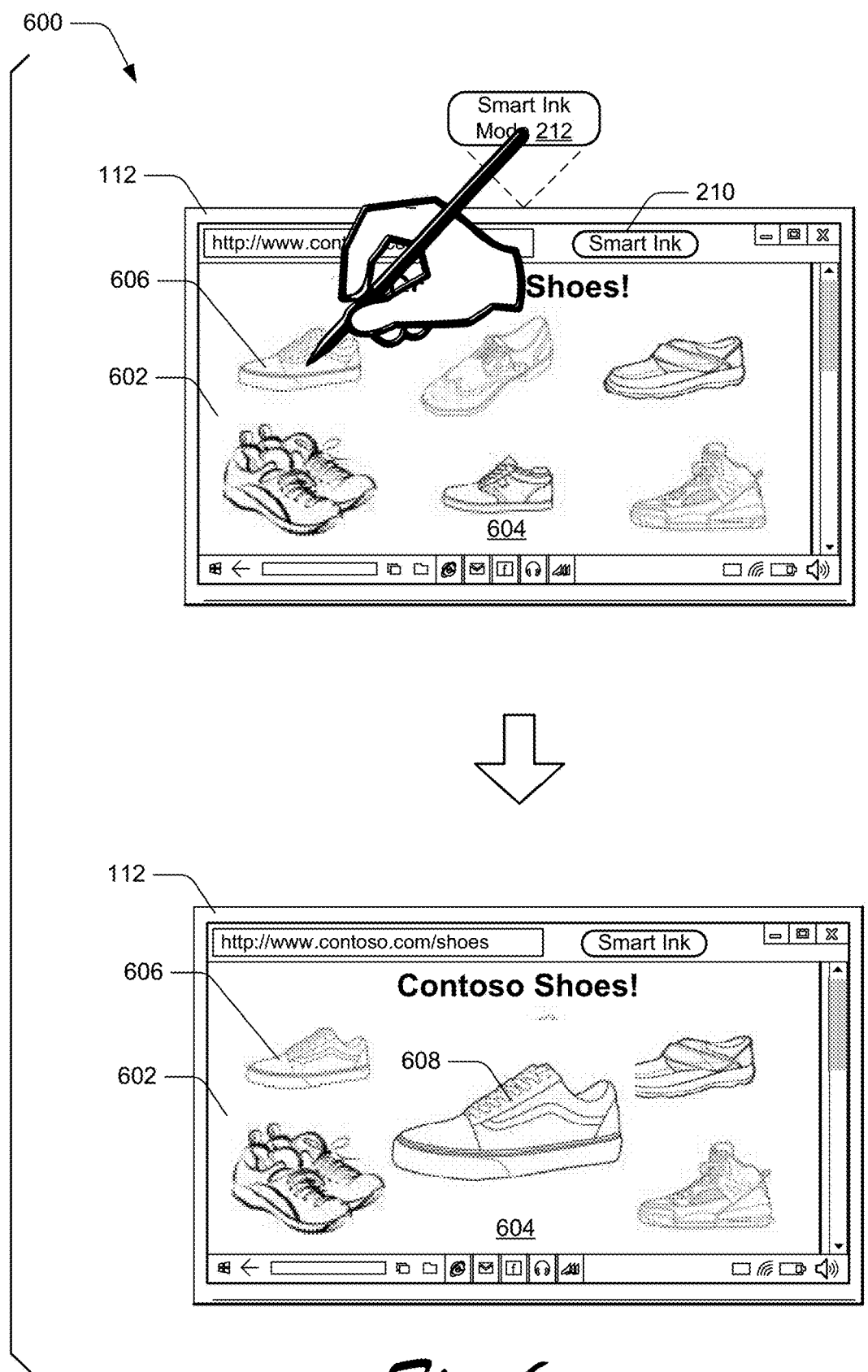
FIG. 6 depicts an example implementation scenario for invoking a smart ink mode for a web page in accordance with one or more embodiments.

FIG. 6 depicts an example implementation scenario 600 for invoking a smart ink mode for a web page in accordance with one or more implementations. The upper portion of the scenario 600 includes a graphical user interface (GUI) 602 displayed on the display device 112. Generally, the GUI 602 represents a GUI for the web browser 110. Displayed within the GUI 602 is a web page 604 which includes various graphical and textual elements. In this particular example, the web page 604 represents a shopping website where users can browse and purchase shoes. Thus, the web page 604 includes images of different shoes.

Further to the scenario 600, a user activates the smart ink mode 212. The user, for instance, selects the ink mode control 210. Alternatively, the user brings the pen 126 in proximity to the surface of the display device 112, which causes the smart ink mode 212 to be automatically invoked for the website 604. Thus, the web page 604 is transformed into an ink canvas. With the web browser 110 in the smart ink mode 212, the user selects a graphical element 606, which in this particular example is an image of a shoe.

Proceeding to the lower portion of the scenario 600 and in response to selection of the graphical element 606 while in the smart ink mode 212, an interactive element 608 is presented, which represents an interactive version of the graphical element 606. The interactive element 608, for instance, is a 3D representation of the graphical element 606 that can be manipulated and edited in various ways.

In the scenario 600, the interactive element 608 is visually overlaid over the web page 604 to indicate that the smart ink mode 212 is active and that the interactive element 608 is able to be manipulated and edited. A visual cue, for example, is provided to indicate that the interactive element 608 is in a manipulatable state. For instance, consider the following example scenarios.

Figure 7:
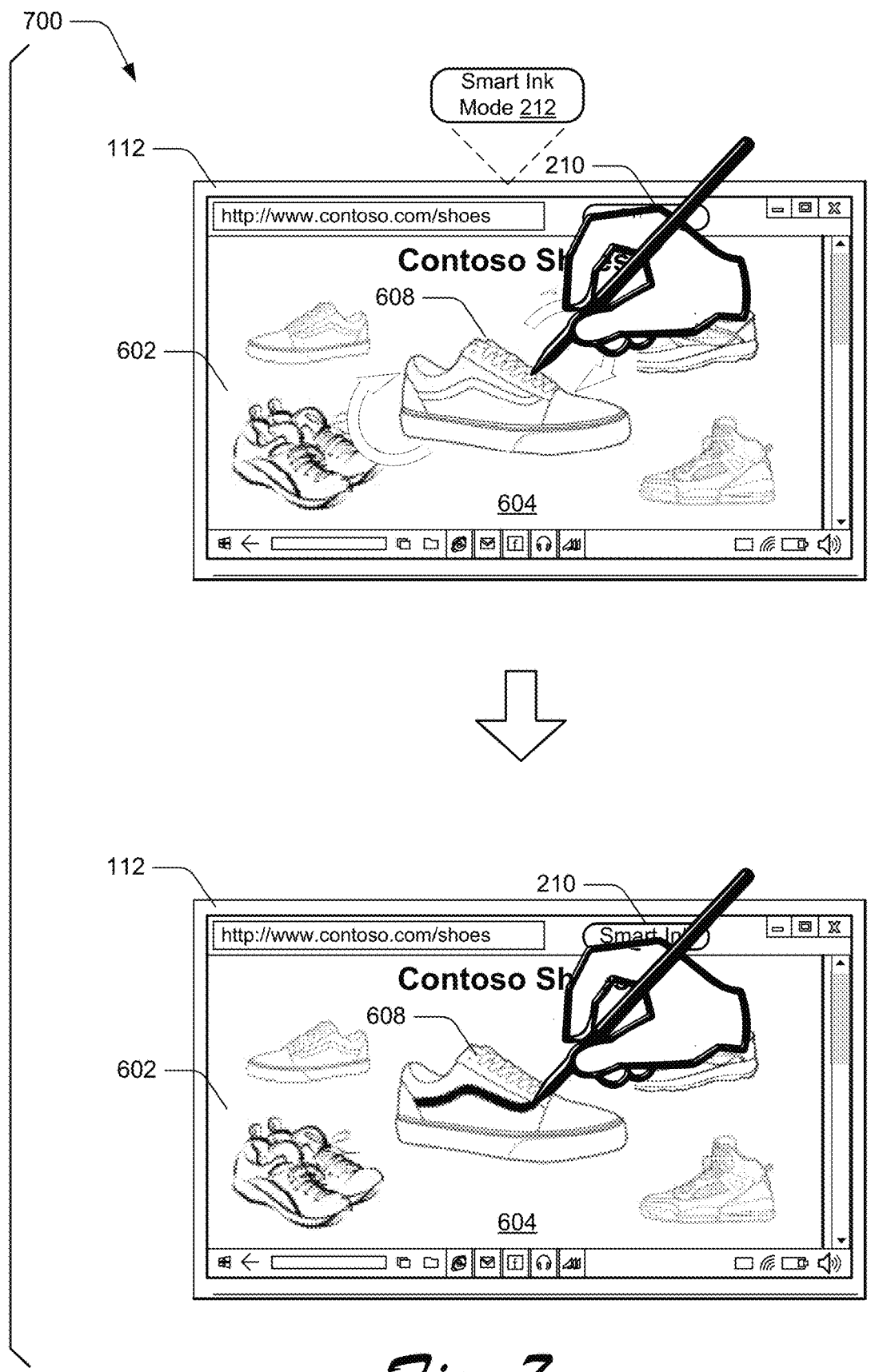
FIG. 7 depicts an example implementation scenario for 3D manipulation of a web page element in accordance with one or more embodiments.

FIG. 7 depicts an example implementation scenario 700 for 3D manipulation of a web page element in accordance with one or more implementations. The scenario 700, for instance, represents a continuation of the scenario 600, discussed above. The upper portion of the scenario 600 includes the graphical user interface (GUI) 602 with the web page 604 displayed on the display device 112. Further, the web page 604 is in the smart ink mode 212 and the interactive element 608 is presented, as described above.

In the upper portion of the scenario 700, the user manipulates the pen 126 to interact with the interactive element 608. For instance, the user drags the pen 126 across the interactive element 608, which causes the interactive element 608 to rotate in 3D. By manipulating the interactive element 608 using the pen 126, the user is able to view different perspectives of the interactive element 608, such as different views of the graphical element 606. The interactive element 608, for example, is rotatable relative to multiple axes, such as different vertical and horizontal axes.

Proceeding to the lower portion of the scenario 700, the user manipulates the pen 126 to apply ink to the interactive element 604. The user, for instance, colors a portion of the interactive element 604 with ink. The user may also make various other changes to the interactive element 604, such as an ink annotation, changing dimensions and positions of lines of the interactive element 604, and so forth. Thus, the smart ink mode 212 enables visual elements to be manipulated in various ways.

Figure 8:
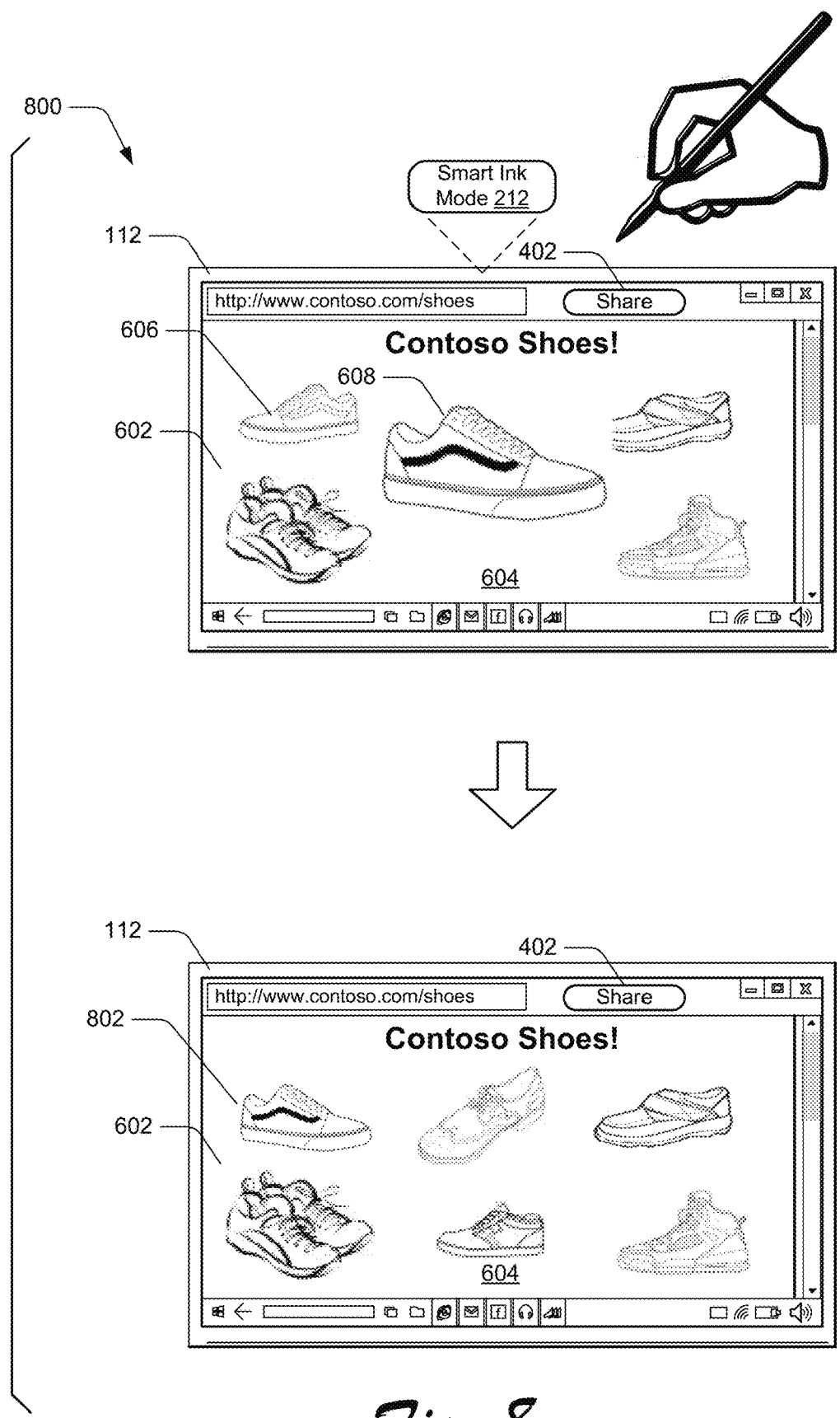
FIG. 8 depicts an example implementation scenario for applying a change to a web page element in accordance with one or more embodiments.

FIG. 8 depicts an example implementation scenario 800 for applying a change to a web page element in accordance with one or more implementations. The scenario 800, for instance, represents a continuation of the scenarios 600, 700 discussed above. The upper portion of the scenario 800 includes the graphical user interface (GUI) 602 with the web page 604 displayed on the display device 112. The web page 604 is in the smart ink mode 212 and the interactive element 608 is presented, as described above.

In the upper portion of the scenario 800, the user performs an action to deactivate the smart ink mode 212. For instance, the user selects the smart ink control 210, which causes the web browser 110 to exit the smart ink mode 212.

Proceeding to the lower portion of the scenario 800 and in responsive to exiting the smart ink mode 212, the interactive element 608 is removed and the graphical element 606 is replaced with a graphical element 802 that is a 2D representation of the interactive element 608. For instance, the graphical element 802 is a snapshot of the interactive element 608 that is captured when the smart ink mode 212 is deactivated. Thus, changes in perspective (e.g., rotation) and editing of the interactive element 608 are reflected in the graphical element 802. In this particular example, the graphical element 802 shows the rotation of the interactive element 608 and the ink applied to the interactive element 608 as described with reference to the scenario 700.

In at least some implementations, the web page 604 is republished with the graphical element 802 replacing the graphical element 606 shown in previous scenarios. For instance, a user that subsequently browses to the web page 604 views the web page 604 with the graphical element 802 instead of the graphical element 606.

According to various implementations, the interactive element 608 and/or the revised web page 604 are shareable in various ways. For instance, consider the following example scenario.

Figure 9:
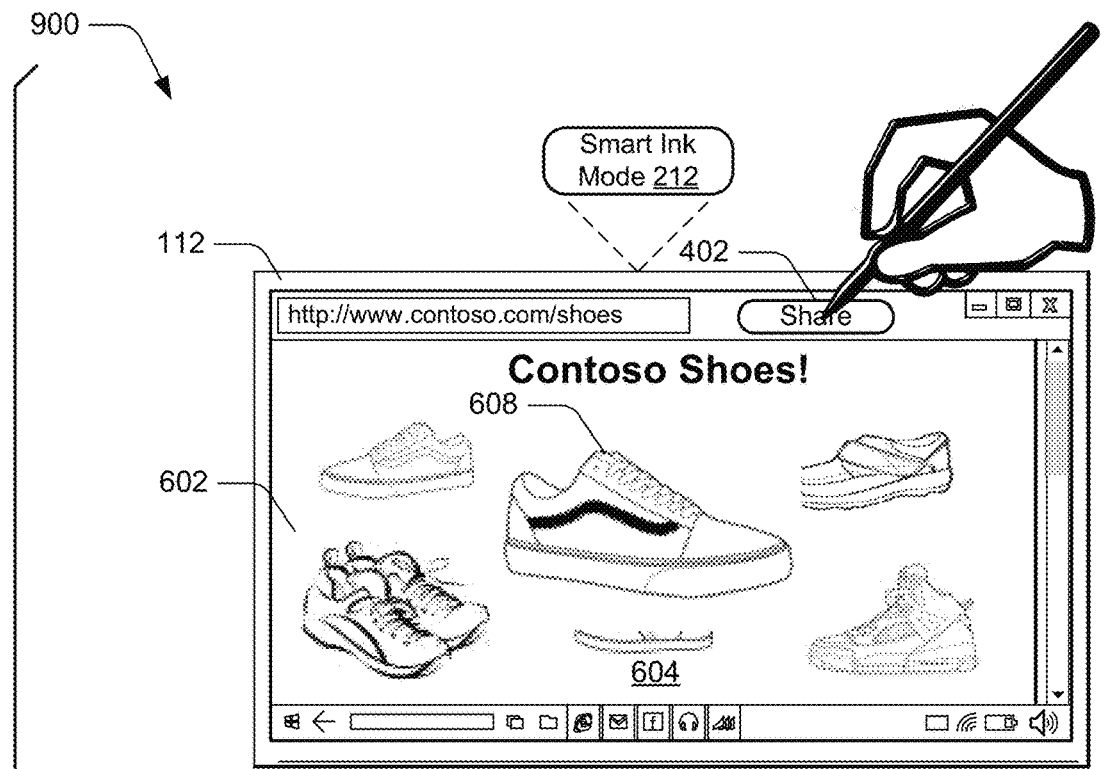
FIG. 9 depicts an example implementation scenario for sharing a web page element in accordance with one or more embodiments.
Figure 9:
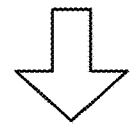
Figure 9:
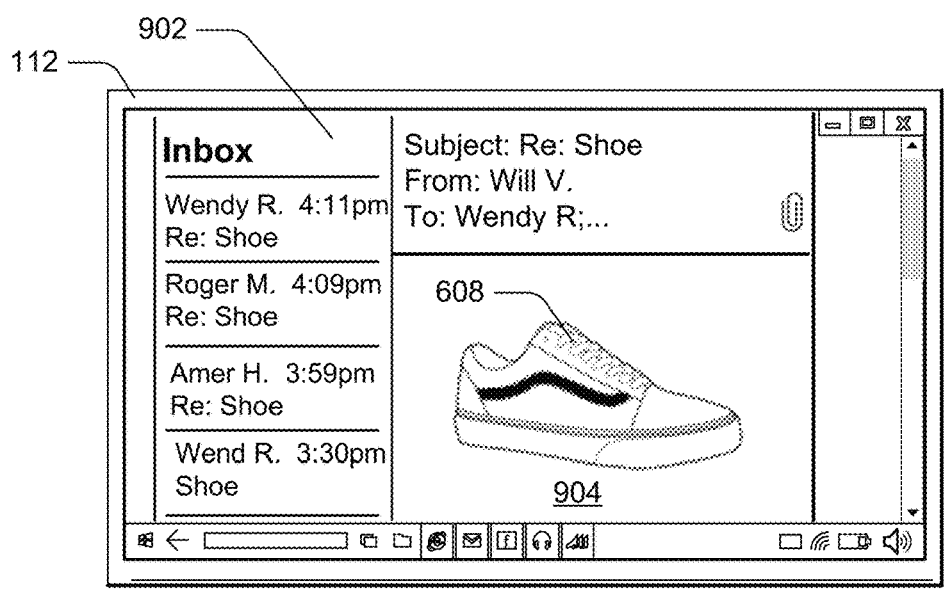

FIG. 9 depicts an example implementation scenario 900 for sharing a web page element in accordance with one or more implementations. The scenario 900, for instance, represents a continuation of the scenarios 600-800 discussed above. The upper portion of the scenario 900 includes the graphical user interface (GUI) 602 with the web page 604 displayed on the display device 112. The web page 604 is in the smart ink mode 212 and the interactive element 608 is presented, as described above.

In the upper portion of the scenario 900, the user performs an action to share the interactive element 608. The user, for instance, selects the share control 402. Alternatively, the user may apply a particular gesture with the pen 126, which is interpreted by the ink module 118 as a command to initiate sharing the interactive element 608.

Proceeding to the lower portion of the scenario 900 and in response to the user action, a copy of the interactive element 608 is populated to a sharing space 902. In this particular example the sharing space 902 includes an email message 904 with the interactive element 608 attached and/or embedded. The sharing space 902, however, may be implemented in various other ways, such as a multimedia message (MMS), a network sharing site, an interactive collaboration application, and so forth.

Accordingly, the user can send the email message 904 with the interactive element 608 to enable a recipient to view and interact with the interactive element 608. For instance, a user that receives the email message 904 can open the interactive element 608 to view the interactive element 608 and make further changes to the interactive element 608. The interactive element 608, for instance, retains its 3D character and manipulability across the sharing experience.

The scenarios presented above describe but a few example implementations for ink in an electronic document. Generally, techniques for ink in an electronic document enable a web page and/or other electronic document to be transformed into a 3D canvas such that elements of the web page can be manipulated as 3D elements in 3-dimensions via ink input. For instance, underlying data about web page elements is considered when applying ink to the web page, such as depth, shape, contour, slope, and so forth. Interactions between elements on a web page can occur in various ways, such as via shadows, lighting, motion, and so forth.

Further, ink input can be used to add elements in 3D that become a part of the web page and affect and/or are affected by other elements of the web page. Thus, techniques for ink in an electronic document can be leveraged to transform a web page into a 3D canvas that is sharable to a variety of different users and devices to enable various manipulations and modifications of the web page that not only consider the underlying structure of the web page, but transform and enhance the underlying structure.

While implementations are discussed herein with respect to ink input using the pen 126, it is to be appreciated that techniques for ink in an electronic document may be implemented using any suitable touch and/or touchless input technique. For instance, other touch input devices 122 may be employed, such as a user's finger, a stylus, and so forth. Alternatively or additionally, touchless input techniques may be employed, such as within a mixed/virtual reality setting implemented using a mixed reality headset or other way of presenting an augmented reality and/or virtual reality user interface. For instance, the various visuals displayed in the scenarios described above may be displayed as part of a mixed/virtual reality setting, and user input via gestures may be detected in such a setting to enable the functionalities described herein. Gestures, for example, may be employed to provide ink input into a web browser interface.

Having described some example implementation scenarios, consider now some example procedures in accordance with one or more implementations.

Example Procedures

The following discussion describes some example procedures for sharing across environments in accordance with one or more embodiments. The example procedures may be employed in the environment 100 of FIG. 1, the system 1400 of FIG. 14, and/or any other suitable environment. The procedures, for instance, represent procedures for implementing the example implementation scenarios discussed above. In at least some embodiments, the steps described for the various procedures can be implemented automatically and independent of user interaction. The procedures may be performed locally at the client device 102, by the ink service 128, and/or via interaction between these functionalities. This is not intended to be limiting, however, and aspects of the methods may be performed by any suitable entity.

Figure 10:
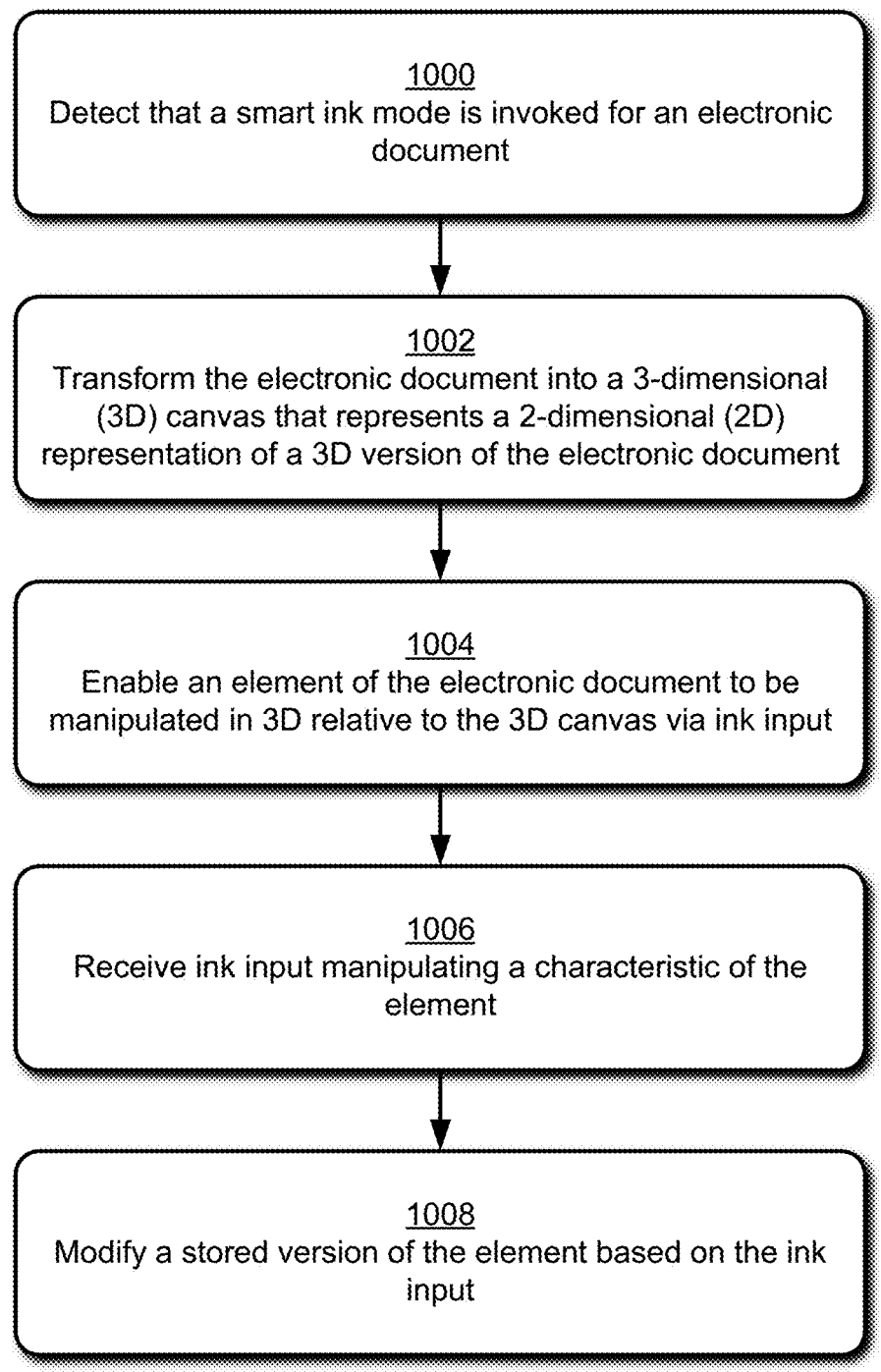
FIG. 10 is a flow diagram of an example method for invoking a smart ink mode for an electronic document in accordance with one or more embodiments.

FIG. 10 is a flow diagram that describes steps in a method in accordance with one or more embodiments. The method describes an example procedure for invoking a smart ink mode for an electronic document in accordance with one or more implementations.

Step 1000 detects that a smart ink mode is invoked for an electronic document. The electronic document, for instance, represents a web page displayed on a display. Different ways of invoking a smart ink mode are discussed above.

Step 1002 transforms the electronic document into a 3-dimensional (3D) canvas that represents a 2-dimensional (2D) representation of a 3D version of the electronic document. For instance, responsive to detecting that the smart ink mode is invoked, the ink module 118 causes the electronic document to transition to an editable canvas that represents an editable version of the electronic document. In an implementation where the electronic document is a web page, the ink module 118 can interact with the web browser 110 to enable the web page to be displayed and editable via the web browser 110.

Step 1004 enables an element of the electronic document to be manipulated in 3D relative to the 3D canvas via ink input. The element, for example, is a graphical element that represents content of the electronic document.

Step 1006 receives ink input manipulating a characteristic of the element. As discussed above, an element can be manipulated in various ways, such as by changing a position, orientation, and/or appearance of the element. Different example ways of manipulating aspects of an element are presented in the implementation scenarios described above.

Step 1008 modifies a stored version of the element based on the ink input. For instance, a stored version of the electronic document is updated to reflect modification of the element.

In one or more implementations, the electronic document represents a web page. Thus, modifying a stored version of the electronic document can include updating a published version of the web page with the modified element. This can enable the updated web page to be accessible via the web browser 110 (e.g., over the Internet) to access and view the updated web page.

Figure 11:
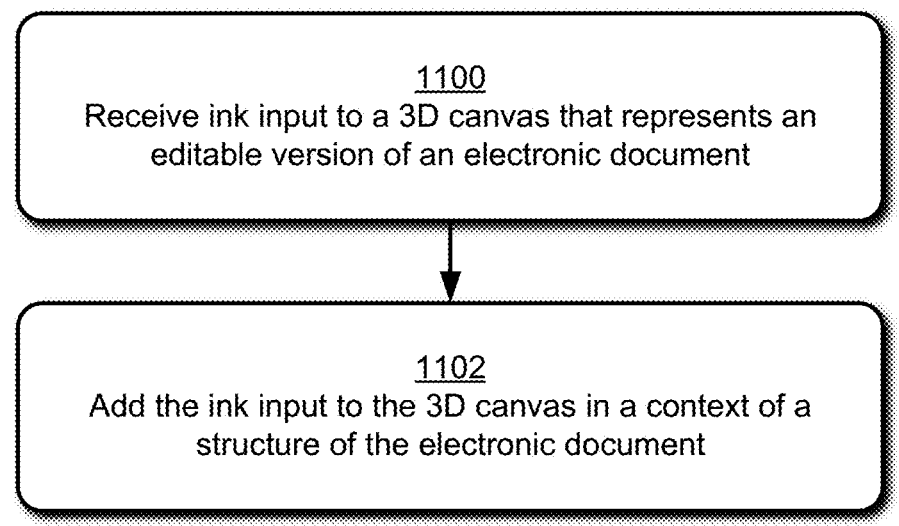
FIG. 11 is a flow diagram of an example method for enabling editing of an electronic document in accordance with one or more embodiments.

FIG. 11 is a flow diagram that describes steps in a method in accordance with one or more embodiments. The method describes an example procedure for enabling editing of an electronic document in accordance with one or more implementations. The method, for instance, describes an example extension of the method described above with reference to FIG. 10.

Step 1100 receives ink input to a 3D canvas that represents an editable version of an electronic document. A user, for instance, invokes a smart ink mode which causes the electronic document to be transformed into an editable 3D canvas, such as described above. The user then applies ink input to the 3D canvas, such as by using the pen 126 to edit an element of the electronic document and/or to add an object to the 3D canvas.

Step 1102 adds the ink input to the 3D canvas in a context of a structure of the electronic document. The ink input, for example, is applied to the electronic document and is affected by the structure of the electronic document. For instance, consider that the ink input is applied across existing text of the electronic document. The shape of the text affects the ink input, such as by causing variations in texture and shading of the ink input as the ink input is applied to the contours of the text input. As another example, ink input is applied to a graphical element of the electronic document. Variations in shading and texture of the graphical element causes corresponding variations in shading and texture of the ink input. Thus, an underlying structure of the electronic document affects a visual appearance of the ink input.

Figure 12:
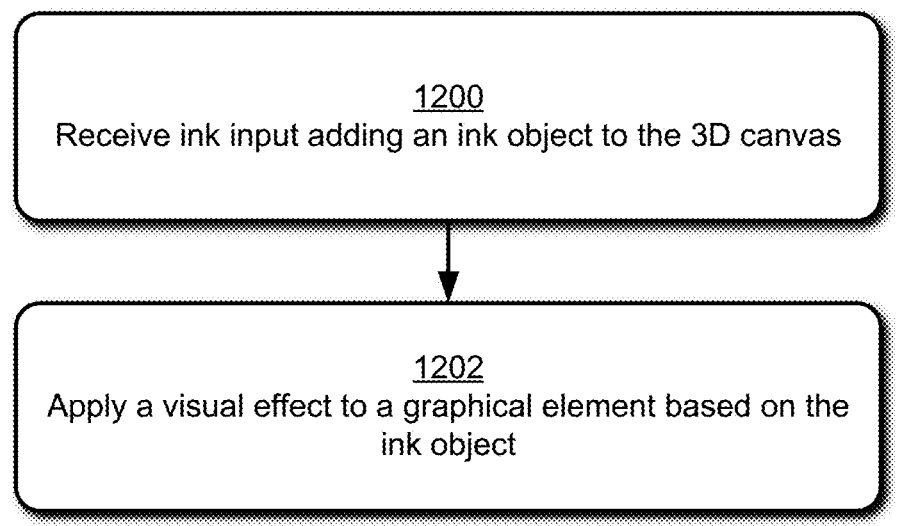
FIG. 12 is a flow diagram of an example method for applying a visual affect based on ink input to an electronic document in accordance with one or more embodiments.

FIG. 12 is a flow diagram that describes steps in a method in accordance with one or more embodiments. The method describes an example procedure for applying a visual affect based on ink input to an electronic document in accordance with one or more implementations. The method, for instance, describes an example extension of the method described above with reference to FIG. 10.

Step 1200 receives ink input adding an ink object to the 3D canvas. A user, for instance, manipulates the pen 126 to draw an object on a 3D canvas.

Step 1202 applies a visual effect to a graphical element based on the ink object. An attribute of the ink object, for instance, is used to apply a visual effect to the graphical element. For example, consider that the ink object is adjacent to and/or partially overlays the graphical element. Accordingly, a shadow can be cast from the ink object over the graphical element.

Alternatively or additionally, a shape of the graphical element can be altered based on the ink object, such as by stretching or compressing the graphical element to accommodate visual positioning of the ink object. These visual effects are presented for purpose of example only, and various other visual effects may be applied within the scope of the claimed implementations.

Figure 13:
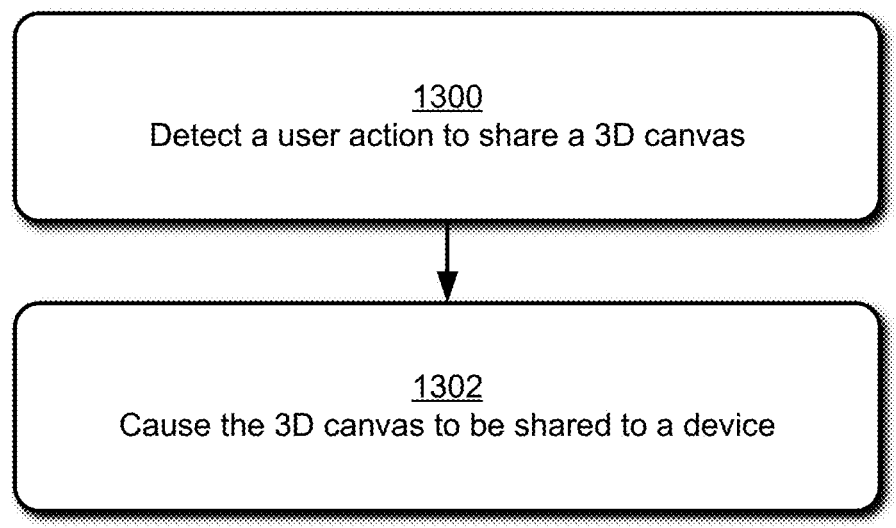
FIG. 13 is a flow diagram of an example method for a 3D canvas in accordance with one or more embodiments.

FIG. 13 is a flow diagram that describes steps in a method in accordance with one or more embodiments. The method describes an example procedure for sharing a 3D canvas in accordance with one or more implementations. The method, for instance, describes an example extension of the methods described above.

Step 1300 detects a user action to share a 3D canvas. The ink module 118, for instance, detects user input indicating a command to share a 3D canvas. Various examples of user actions to initiate sharing of a 3D canvas are discussed above.

Step 1302 causes the 3D canvas to be shared to a device. In at least some implementations, the 3D canvas is shared from one device to another device. Generally, sharing the 3D canvas enables the 3D canvas to be viewed and edited by other devices and users. For instance, when a graphical element of a 3D canvas is modified and the 3D canvas is then shared to a different device, the modified graphical element along with other portions of the 3D canvas are editable at the different device.

In at least some implementations, a 3D canvas can be shared via device-to-device communication, such as directly and/or over an intermediate network. Alternatively or additionally, the 3D canvas can be shared to a network site that is accessible to other devices. For instance, the 3D canvas can be shared to a collaborative site such that multiple users can access and manipulate the 3D canvas via the collaborative site.

As another example, the 3D canvas can be published as part of a website. The 3D canvas, for instance, can be stored as a website that is accessible via a network, such as over the Internet. Thus, an address (e.g., a uniform resource locator (URL) and/or a hyperlink) for a network location at which the website is hosted can be shared to different devices to enable the website to be accessed and manipulated.

Having described some example procedures for ink in an electronic document, consider now a discussion of an example system and device in accordance with one or more embodiments.

Example System and Device

Figure 14:
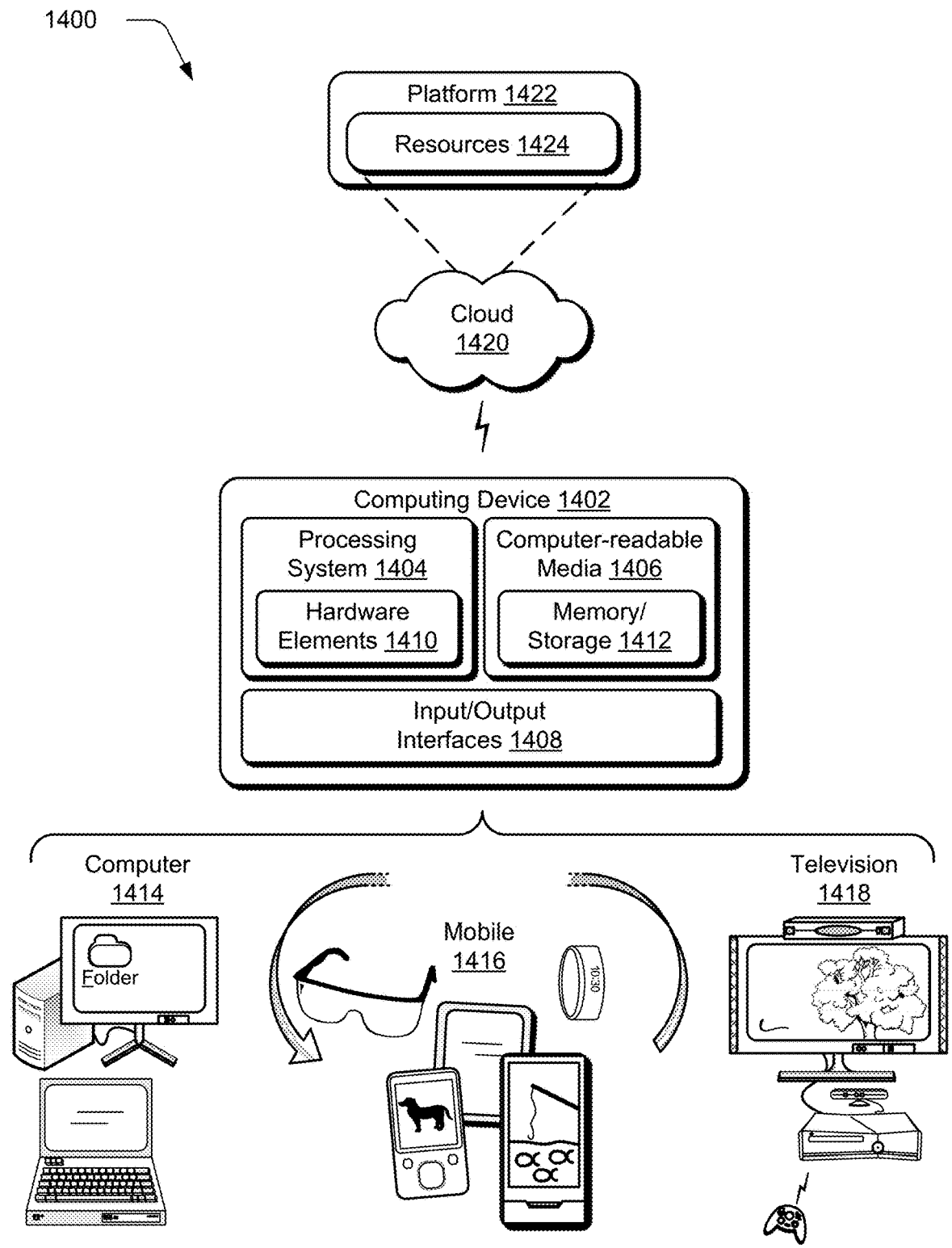
FIG. 14 illustrates an example system and computing device as described with reference to FIG. 1, which are configured to implement embodiments of techniques described herein.

FIG. 14 illustrates an example system generally at 1400 that includes an example computing device 1402 that is representative of one or more computing systems and/or devices that may implement various techniques described herein. For example, the client device 102 and/or the ink service 128 discussed above with reference to FIG. 1 can be embodied as the computing device 1402. The computing device 1402 may be, for example, a server of a service provider, a device associated with the client (e.g., a client device), an on-chip system, and/or any other suitable computing device or computing system.

The example computing device 1402 as illustrated includes a processing system 1404, one or more computer-readable media 1406, and one or more Input/Output (I/O) Interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1406 is illustrated as including memory/storage 1412. The memory/storage 1412 represents memory/storage capacity associated with one or more computer-readable media. The memory/storage 1412 may include volatile media (such as random access memory (RAM)) and/or nonvolatile media (such as read only memory (ROM), Flash memory, optical disks, magnetic disks, and so forth). The memory/storage 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1410 and computer-readable media 1406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of modules that are executable by the computing device 1402 as software may be achieved at least partially in hardware, e.g., through use of computer-readable storage media and/or hardware elements 1410 of the processing system. The instructions and/or functions may be executable/operable by one or more articles of manufacture (for example, one or more computing devices 1402 and/or processing systems 1404) to implement techniques, modules, and examples described herein.

As further illustrated in FIG. 14, the example system 1400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1402 may assume a variety of different configurations, such as for computer 1414, mobile 1416, and television 1418 uses. Each of these configurations includes devices that may have generally different constructs and capabilities, and thus the computing device 1402 may be configured according to one or more of the different device classes. For instance, the computing device 1402 may be implemented as the computer 1414 class of a device that includes a personal computer, desktop computer, a multi-screen computer, laptop computer, netbook, and so on.

The computing device 1402 may also be implemented as the mobile 1416 class of device that includes mobile devices, such as a mobile phone, portable music player, portable gaming device, a tablet computer, a wearable device, a multi-screen computer, and so on. The computing device 1402 may also be implemented as the television 1418 class of device that includes devices having or connected to generally larger screens in casual viewing environments. These devices include televisions, set-top boxes, gaming consoles, and so on.

The techniques described herein may be supported by these various configurations of the computing device 1402 and are not limited to the specific examples of the techniques described herein. For example, functionalities discussed with reference to the client device 102, the ink module 118, and/or the ink service 128 may be implemented all or in part through use of a distributed system, such as over a "cloud" 1420 via a platform 1422 as described below.

The cloud 1420 includes and/or is representative of a platform 1422 for resources 1424. The platform 1422 abstracts underlying functionality of hardware (e.g., servers) and software resources of the cloud 1420. The resources 1424 may include applications and/or data that can be utilized while computer processing is executed on servers that are remote from the computing device 1402. Resources 1424 can also include services provided over the Internet and/or through a subscriber network, such as a cellular or Wi-Fi network.

The platform 1422 may abstract resources and functions to connect the computing device 1402 with other computing devices. The platform 1422 may also serve to abstract scaling of resources to provide a corresponding level of scale to encountered demand for the resources 1424 that are implemented via the platform 1422. Accordingly, in an interconnected device embodiment, implementation of functionality described herein may be distributed throughout the system 1400. For example, the functionality may be implemented in part on the computing device 1402 as well as via the platform 1422 that abstracts the functionality of the cloud 1420.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system for modifying a stored version of a graphical element based on ink input, the system including: a display; one or more processors; and one or more computer-readable storage media storing computer-executable instructions that, responsive to execution by the one or more processors, cause the system to perform operations including: transforming an electronic document into a 3-dimensional (3D) canvas that represents a 2-dimensional (2D) representation of a 3D version of the electronic document; enabling a graphical element of the electronic document to be manipulated in 3D relative to the 3D canvas via ink input; receiving ink input manipulating a characteristic of the graphical element; and modifying a stored version of the graphical element based on the ink input.

Example 2

The system as described in example 1, wherein the electronic document includes a web page, and the graphical element includes a graphical element of the web page.

Example 3

The system as described in one or more of examples 1 or 2, wherein the electronic document includes a web page, and said transforming is performed responsive to detecting that a smart ink mode is invoked for the web page.

Example 4

The system as described in one or more of examples 1-3, wherein said enabling is performed responsive to a selection of the graphical element via a pen.

Example 5

The system as described in one or more of examples 1-4, wherein the operations further include: receiving ink input to the 3D canvas; and adding the ink input to the 3D canvas in a context of a structure of the electronic document.

Example 6

The system as described in one or more of examples 1-5, wherein the electronic document includes a further graphical element, and wherein the operations further include: receiving ink input adding an ink object to the 3D canvas; and applying a visual effect to the further graphical element based on the ink object.

Example 7

The system as described in one or more of examples 1-6, wherein the ink input includes an annotation of the graphical element, and wherein said modifying includes adding the annotation to the stored version of the graphical element.

Example 8

The system as described in one or more of examples 1-7, wherein the electronic document includes a web page, and wherein the operations further include: updating the web page to replace the graphical element with the modified stored version of the graphical element, said updating causing a published version of the web page to be updated.

Example 9

The system as described in one or more of examples 1-8, wherein the operations further include causing the 3D canvas to be shared to a different system as an editable version of the 3D canvas.

Example 10

A method for enabling an element of an electronic document to be manipulated via ink input, the method including: detecting that a smart ink mode is invoked for an electronic document; transforming, responsive to said detecting, the electronic document into a 3-dimensional (3D) canvas that represents a 2-dimensional (2D) representation of a 3D version of the electronic document; and enabling an element of the electronic document to be manipulated in 3D relative to the 3D canvas via ink input.

Example 11

The method as described in example 10, wherein the electronic document includes a web page, and the element includes a graphical element of the web page.

Example 12

The method as described in one or more of examples 10 or 11, wherein the electronic document includes a web page, the graphical element includes a graphical element of the web page, and wherein said enabling includes enabling the graphical element to be rotated within the 3D canvas relative to multiple axes of the graphical element to simulate a 3D rotation of the graphical element.

Example 13

The method as described in one or more of examples 10-12, further including: receiving a selection of the element from the 3D canvas; and providing, responsive to said receiving, a visual cue that the element is able to be manipulated and edited to affect an appearance of the element.

Example 14

The method as described in one or more of examples 10-13, further including: receiving an edit to the element via the 3D canvas; causing the element to be modified based on the edit; and causing a published version of the electronic document to be updated with the modified element.

Example 15

The method as described in one or more of examples 10-14, wherein the ink input includes an annotation of the element, and wherein said modifying includes adding the annotation to the stored version of the electronic document.

Example 16

The method as described in one or more of examples 10-15, further including: receiving ink input to the 3D canvas; adding the ink input as an ink object to the 3D canvas; and applying a visual effect to a further graphical element of the electronic document based on the ink object.

Example 17

The method as described in one or more of examples 10-16, further including: receiving, via a first device, an edit to the element via the 3D canvas; causing the element to be modified based on the edit; and causing the 3D canvas with the modified element to be shared to a second device as an editable version of the 3D canvas.

Example 18

A method for enabling a graphical element of an electronic document to be shared to a device in an editable form, the method including: transforming an electronic document into a 3-dimensional (3D) canvas that represents a 2-dimensional (2D) representation of a 3D version of the electronic document; enabling a graphical element of the electronic document to be manipulated in 3D relative to the 3D canvas via ink input; receiving, at a first device, ink input manipulating a characteristic of the graphical element to generate a modified graphical element; and causing the 3D canvas with the modified graphical element to be shared to a second device such that the modified graphical element is editable at the second device via interaction with the 3D canvas.

Example 19

The method as described in example 18, wherein said causing includes causing the 3D canvas to be published to a network location such that the 3D canvas is accessible and editable via the network location.

Example 20

The method as described in one or more of examples 18 or 19, wherein the electronic document includes a web page, and wherein said causing includes sharing the web page in an editable form to the second device.

CONCLUSION

Techniques for ink in an electronic document are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method comprising:

receiving, through a graphical user interface, a first user interface selection of a user interface element that is configured to toggle application of a smart ink mode, wherein the first user interface selection activates the smart ink mode;

in response to receiving the first user interface selection, transforming a 2-dimensional (2D) representation of an electronic document into a 3-dimensional (3D) representation of the electronic document that is configured to manage a digital ink input;

receiving, while the electronic document is in the smart ink mode, an ink input that overlaps a content portion of the electronic document;

analyzing, while the electronic document is in the smart ink mode, the ink input relative to an underlying structure of content of the electronic document including attributes of the content portion;

automatically manipulating characteristics of the ink input based on a result of the analyzing;

presenting, while the electronic document is in the smart ink mode, a modified version of the ink input based on a result of the automatically manipulating;

receiving, through the graphical user interface, a second user interface selection of the user interface element that results in de-activating the smart ink mode;

in response to receiving the second user interface selection, transforming the 3D representation of the electronic document into the 2D representation of the electronic document.

2. The method as described in claim 1, wherein the automatically manipulating modifies a shape and a size of the ink input originally received.

3. The method as described in claim 1, wherein the automatically manipulating modifies a texture of the ink input originally received.

4. The method as described in claim 1, wherein the automatically manipulating modifies a shading of the ink input originally received.

5. The method as described in claim 1, further comprising: applying an ink input module that is configured to execute: the analyzing of the ink input relative to the underlying structure of content of the electronic document, and the automatically manipulating of the characteristics of the ink input.

6. The method as described in claim 1, wherein the presenting presents the modified version of the ink input through a graphical user interface that is presenting the electronic document in the smart ink mode.

7. The method as described in claim 1, wherein the automatically manipulating modifies a placement position of the ink input based on an analysis of the attributes of the content portion.

8. A computer-readable storage device, including at least one processor, storing computer-executable instructions that, when executed by the at least one processor, causes the at least one processor to execute a method comprising:

receiving a first indication, that a first selection is made, through an application or service, of a user interface element that is configured to toggle application of a smart ink mode, wherein the first selection activates the smart ink mode;

in response to receiving the first indication, transforming a 2-dimensional (2D) representation of the electronic document into a 3-dimensional (3D) representation of the electronic document that is configured to manage a digital ink input;

receiving, while the electronic document is in the smart ink mode, an ink input that overlaps a content portion of the electronic document;

analyzing, while the electronic document is in the smart ink mode, the ink input relative to an underlying structure of content of the electronic document including attributes of the content portion;

automatically manipulating characteristics of the ink input based on a result of the analyzing;

transmitting, for rendering, a modified version of the ink input based on a result of the automatically manipulating;

receiving a second indication, that a second selection is made, through an application or service, of the user interface element, wherein the second selection de-activates the smart ink mode;

in response to receiving the second indication, transmitting data for transforming the 3D representation of the electronic document into the 2D representation of the electronic document.

9. The computer-readable storage device as described in claim 8, wherein the automatically manipulating modifies a shape and a size of the ink input originally received.

10. The computer-readable storage device as described in claim 8, wherein the automatically manipulating modifies, for the ink input, one or more selected from a group consisting of: a texture of the ink input originally received and a shading of the ink input originally received.

11. The computer-readable storage device as described in claim 8, wherein the executed method further comprising: detecting two or more characteristics from: a size of the ink input, a shape of the ink input, a texture of the ink input and a shading of the ink input, and wherein the automatically manipulating further contemplates the two or more detected characteristics when generating the modified version of the ink input.

12. The computer-readable storage device as described in claim 8, wherein the executed method further comprising: applying an ink input module that is configured to execute: the analyzing of the ink input relative to the underlying structure of content of the electronic document, and the automatically manipulating of the characteristics of the ink input.

13. The computer-readable storage device as described in claim 8, further comprising: rendering the modified version of the ink input for presentation through a graphical user interface.

14. A system comprising:

one or more processors; and one or more computer-readable storage media, operatively connected with the one or more processors, storing computer-executable instructions that, responsive to execution by the one or more processors, cause the system to perform operations including:

receiving, through a graphical user interface, a first user interface selection of a user interface element that is configured to toggle application of smart ink mode, wherein the first user interface selection activates the smart ink mode;

in response to receiving the first user interface selection, transforming a 2-dimensional (2D) representation of an electronic document into a 3-dimensional (3D) representation of the electronic document that is configured to manage a digital ink input;

receiving, while the electronic document is in the smart ink mode, an ink input that overlaps a content portion of the electronic document;

analyzing, while the electronic document is in the smart ink mode, the ink input relative to an underlying structure of content of the electronic document including attributes of the content portion;

automatically manipulating characteristics of the ink input based on a result of the analyzing;

presenting, while the electronic document is in the smart ink mode, a modified version of the ink input based on a result of the automatically manipulating;

receiving, through the graphical user interface, a second user interface selection of the user interface element that results in de-activating the smart ink mode;

in response to receiving the second user interface selection, transforming the 3D representation of the electronic document into the 2D representation of the electronic document.

15. The system as described in claim 14, wherein the automatically manipulating modifies a shape and a size of the ink input originally received.

16. The system as described in claim 14, wherein the automatically manipulating modifies a texture of the ink input originally received.

17. The system as described in claim 14, wherein the automatically manipulating modifies a shading of the ink input originally received.

18. The system as described in claim 14, wherein the operations, executed by the one or more processors, further comprises: applying an ink input module that is configured to execute: the analyzing of the ink input relative to the underlying structure of content of the electronic document, and the automatically manipulating of the characteristics of the ink input.

19. The system as described in claim 14, wherein the presenting presents a graphical user interface element for confirmation of the modified version of the ink input.

20. The system as described in claim 14, wherein the automatically manipulating modifies a placement position of the ink input based on an analysis of the attributes of the content portion.

* * * * *